March 27, 1962  E. K. NILSSON  3,026,905
MULTIPLE VALVE DEVICES
Filed March 5, 1959  2 Sheets-Sheet 1

INVENTOR
Eirik Kjell Nilsson
BY
ATTORNEY

March 27, 1962 E. K. NILSSON 3,026,905
MULTIPLE VALVE DEVICES
Filed March 5, 1959 2 Sheets-Sheet 2
Fig. 3
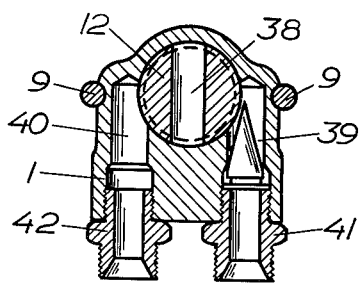
Fig. 4
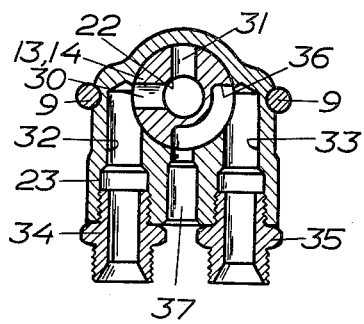
Fig. 5
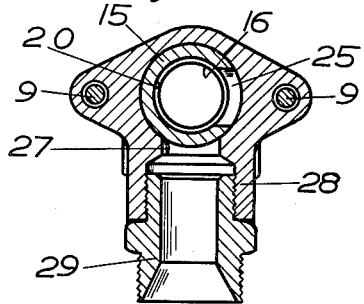
Fig. 6
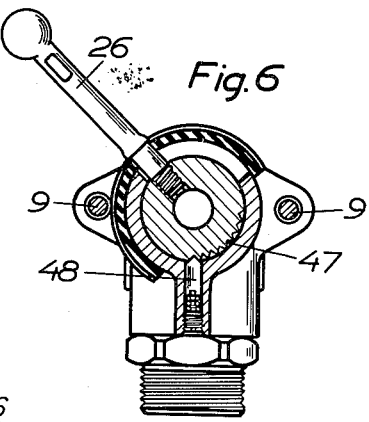
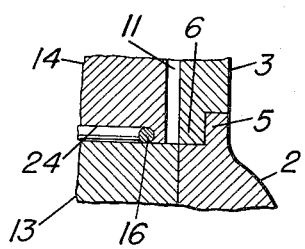
Fig. 7
INVENTOR
Erik Kjell Nilsson
BY
ATTORNEY

United States Patent Office 3,026,905
Patented Mar. 27, 1962

3,026,905
MULTIPLE VALVE DEVICES
Erik Kjell Nilsson, Nacka, Sweden, assignor to Atlas Copco Aktiebolag, Nacka, Sweden, a corporation of Sweden
Filed Mar. 5, 1959, Ser. No. 797,531
Claims priority, application Sweden Mar. 11, 1958
5 Claims. (Cl. 137—624)

This invention relates to multiple valve devices comprising a number of valve casings held together to form a unit which may be provided on a machine such as a drill carriage for rock drills in order to take care of the control of various operations or functions which it may be desired to control from a central location. It has previously been suggested to provide such valve units comprising a group of valve casings with pertaining valve gear, which has been disposed side by side on a suitable base plate. It has also been suggested to provide a number of valve casings each provided with a piston type of slide valve or similar valve member and held together to form a unit in which the valve members are parallel. The valve devices known so far are comparatively expensive and require considerable space. One object of the invention is to provide a multiple valve device which is simple in design and takes little space and which is simple and cheap to manufacture.

Figure 2:
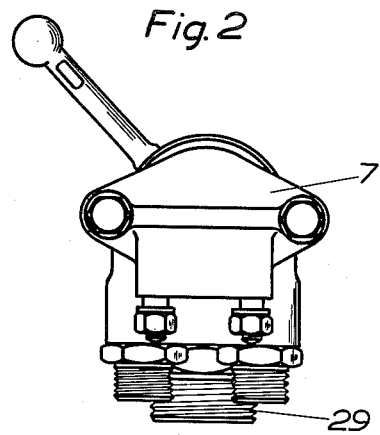
Figure 1:
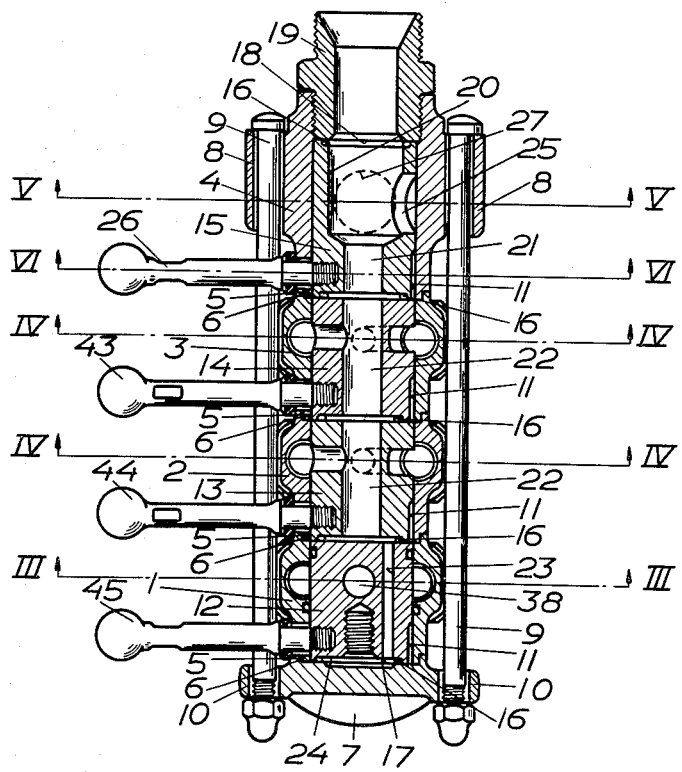

One embodiment of a multiple valve device embodying the invention is illustrated in the accompanying drawings, but various modifications of the invention may be made within the scope of the claims. In the drawings, FIG. 1 is a longitudinal section of a multiple valve device embodying the invention comprising four valve casings and four rotary valve members provided in said casings. FIG. 2 is an end view of the valve device shown in FIG. 1. FIGS. 3, 4, 5 and 6 are transverse sections on lines III—III, IV—IV, V—V and VI—VI, respectively, of FIG. 1. FIG. 7 is a fragmentary sectional view to an enlarged scale, showing the details of the abutting ends of the valve casings and valve members.

The multiple valve device illustrated in the drawings comprises four valve casings 1, 2, 3 and 4, the valve casings 2 and 3 being identical. All valve casings are provided with axial flanges 5 which fit abutments 6 on the adjacent valve casings. A cover 7 provided at one end of the valve unit is provided with a similar flange 5 which fits the abutment 6 of the adjoining valve casing 1. The valve casing 4 is provided with two lugs 8. Bolts 9 extend through openings in said lugs 8 and along guide grooves in the other valve casings 3, 2, 1 and through openings in lugs 10 provided on the cover 7 and said bolts carry suitable nuts and serve to hold together the valve casings as a unit. Each valve casing 1, 2, 3, 4 has a central bore 11 of the same diameter and said bores 11 accommodate rotary valve members 12, 13, 14, and 15, respectively. The rotary valve members 12, 13, and 14 each extend per se throughout the pertaining valve casing and are arranged axially one after the other and preferably in alignment as is obvious from FIG. 1. In a recess at one end of each valve member 12, 13, 14 and at both ends of the valve member 15 an O-ring 16 is provided which forms a seal with the end face of the adjacent valve member and with a sealing surface 17 on the cover 7 and a sealing surface 18 on a bushing 19 screw-threaded into the valve casing 4. The sealing rings 16 are each of the same size and prevent leakage radially towards the peripheral surface of the valve members at the end faces of the valve members. The abutting ends of the valve casings 2 and 3 and the rotary valve members 13 and 14 are particularly shown in FIG. 7, and are typical of the abutting ends of the other valve casings and rotary valve members.

The valve device illustrated in the drawings is intended for use on a drill carriage and for this purpose one valve member 15 forms the main valve for controlling the supply of compressed air to a rock drill for operating the percussion motor of said drill, a second valve member 14 serves to control the compressed air supply to a feeding device for the rock drill for movement of the drill toward and away from the rock face, a third valve member 13 serves to provide compressed air for engaging and disengaging a drill guide for the rock drill steel, and a fourth valve member 12 serves to control the supply of flushing water to the rock drill. Compressed air is supplied to the valve device through the bushing 19 from which the air passes into the bore 20 of the valve member 15 and further through the bore 21 in said valve member to a bore 22 in the valve member 14 and then to a bore 22 in the valve member 13 and finally through a bore 23 in the valve member 12 to a space 24 between the end face of said valve member and the cover 7. The compressed air admitted through the bushing 19 consequently does not produce an axial pressure on the valve members. The valve member 15 is provided with a radial bore 25 and a radially extending handle 26 which projects through an opening in the valve casing 4 and serves to rotate the valve member so that the bore 25 communicates more or less with a passage 27 in the projection 28 which accommodates the hose connection 29 for a hose (not illustrated) leading to the rock drill. The valve members 13 and 14 are provided with radial bores 30, 31 which communicate with the bore 22 and which may be brought into position to provide a communication between said bore and one or the other of two passages 32 and 33, respectively, in the valve casings 2 and 3 to which suitable hoses may be connected by means of hose connections 34 and 35, respectively. The valve members 13, 14 are further provided with a peripheral recess 36 through which one or the other of the passages 32 and 33 may be connected to a venting passage 37 in the valve casings 2 and 3, respectively. The valve member 12 in the valve casing 1 is provided with a passage 38, and the casing 1 is provided with passages 39 and 40 to which suitable hoses may be connected by means of hose connections 41 and 42, respectively, in such a manner, for instance, that the hose connection 41 is connected to a source of flushing water and the hose connection 42 with a hose leading to the flushing water inlet of a rock drill. The bore 38 in the valve member 12 may be positioned upon rotation of said valve member so as to form a communication between the passages 39 and 40. Sealing rings are provided at the periphery of the valve member 12 to seal the water passages from the air passages and from the atmosphere. Handles 43, 44, and 45, respectively, extend radially from the valve members 14, 13, and 12, respectively, for operating said valve members. All valve members are provided at their peripheral surfaces with a toothed portion as indicated at 47 in FIG. 6 and a spring-loaded detent pin 48 is provided in each valve casing and engages the pertaining toothed portion 47 to keep the respective valve member in any desired position of adjustment.

It is obvious from the above description and the drawings that the elements of the valve device embodying the invention are extremely simple to manufacture since all valve casings have a through-bore of the same diameter and all valve members are externally cylindrical with the same external diameter. The number of valve casings, the combination of different valve casings and the arrangement of fluid passages to and from the valve casings and of venting passages in the valve casings may naturally be varied in various ways depending upon whether the valves are used to control compressed air and water or other fluids and depending upon the requirements of the machine which the valve device is intended to serve.

The valve device described hereinabove and illustrated in the drawings should be considered only as an example and the details of the invention may be modified in several different ways within the scope of the claims.

What I claim is:

1. A multiple valve device comprising a plurality of valve casings, each casing having a bore extending therethrough, each casing having a passage communicating with said bore and the exterior of the casing, means for securing said casings together, with said bores in axial alignment to provide a unitary structure, a valve member rotatably mounted in each bore of each casing, said valve members having opposed end surfaces and being disposed in axial alignment, each valve member having an axial passage extending therethrough, each valve member having a radial passage communicating with said bore, sealing means disposed between and engaging said opposed end surfaces to prevent leakage from said axial passage outwardly between said valve members, peripheral sealing means on at least one valve member for preventing leakage from said radial passage toward said end surfaces and means for independently rotating each valve member.

2. A valve device as defined in claim 1 in which at least one casing is provided with two passages extending transversely of said casing substantially tangentially to the valve member disposed in said casing and opening at one side of said casing, the valve member disposed in said casing having a diametrically extending passage for providing communication between said two passages.

3. A valve device as defined in claim 1 in which one end surface on each valve member is provided with an annular recess communicating with said axial passage, an axially projecting annular flange on said one end surface defining the outer periphery of said recess and a sealing ring disposed in said recess and engaging said one end surface and the inner peripheral surface of said flange.

4. A valve device as defined in claim 1, in which a valve casing is provided having two passages extending transversely of the casing substantially tangentially to the valve member disposed in said casing and opening at one side of the casing and a vent passage in the casing extending from the valve member towards the outside of the casing between said two passages, the valve member having passages for connecting one of said two passages in the casing with a central bore in said valve member and another passage for connecting said vent passage with the other of said two passages in the casing.

5. A valve device as defined in claim 4, in which the valve member is provided with a peripheral passage for connecting one of said tangential passages in the valve casing with said vent passage in one position of the valve member and for connecting the other of said tangential passages in the valve casing with said vent passage in another position of the valve member.

References Cited in the file of this patent

UNITED STATES PATENTS

| | | |
|---|---|---|
| 2,889,852 | Dunlop | June 9, 1959 |

FOREIGN PATENTS

| | | |
|---|---|---|
| 646,259 | France | July 10, 1928 |
| 752,100 | France | July 10, 1933 |
| 602,890 | Great Britain | June 4, 1948 |
| 192,700 | Austria | Oct. 25, 1957 |